United States Patent [19]

Breitenbach

[11] 4,291,083

[45] Sep. 22, 1981

[54] SLIDING BARRIER FOR FURNITURE DEVICES AND OPENINGS IN BUILDINGS

[75] Inventor: Jens Breitenbach, Haan, Fed. Rep. of Germany

[73] Assignee: Bayer Aktiengesellschaft, Fed. Rep. of Germany

[21] Appl. No.: 102,081

[22] Filed: Dec. 10, 1979

[30] Foreign Application Priority Data

Dec. 22, 1978 [DE] Fed. Rep. of Germany ....... 2855652

[51] Int. Cl.[3] ................................................ B32B 3/30

[52] U.S. Cl. .................................... 428/163; 428/166; 428/188

[58] Field of Search ................. 428/17, 119, 120, 163, 428/166, 178, 182, 184, 188, 192, 358, 122; 264/252; 312/140, 294, 296, 297, 298, 318, 341 R, 341 NR

[56] References Cited

U.S. PATENT DOCUMENTS

| | | | |
|---|---|---|---|
| 3,231,454 | 1/1966 | Williams | 428/166 |
| 3,330,611 | 7/1967 | Heifetz | 312/297 |
| 3,460,878 | 8/1969 | Peterson et al. | 312/297 |
| 3,533,896 | 10/1970 | Hartig | 428/122 |
| 3,713,923 | 1/1973 | Laguene | 264/252 |
| 3,758,650 | 9/1973 | Hurst | 264/252 |
| 3,846,001 | 11/1974 | Kaplan et al. | 312/341 NR |
| 3,891,732 | 6/1975 | Hurst | 264/252 |
| 3,892,902 | 7/1975 | Ilukowicz | 428/166 |
| 4,102,720 | 7/1978 | Kaneko et al. | 428/188 |
| 4,172,749 | 10/1979 | Liggett | 428/188 |
| 4,203,268 | 5/1980 | Gladden, Jr. et al. | 428/178 |

*Primary Examiner*—William J. Van Balen
*Attorney, Agent, or Firm*—Connolly and Hutz

[57] ABSTRACT

The invention relates to a sliding barrier for cupboards which is made of plastics material and consists of a continuous flexible film with reinforcing ribs provided transversely to the rolling direction.

6 Claims, 3 Drawing Figures

SLIDING BARRIER FOR FURNITURE DEVICES AND OPENINGS IN BUILDINGS

The invention relates to a sliding barrier for furniture, devices and openings in buildings, consisting of a flat plastic web which is provided with reinforcing ribs transversely to the rolling direction.

Sliding barriers are used for closing openings if it is desired to make only one movement in the closing plane while at the same time being able to make a partial blockage.

Roller shutters for cupboards are known, in which parallel slats are joined together by flexible transverse strips, which in turn allow them to be wound on to a roller.

Although the parallel slats are close to each other when the roller shutter is pulled out, fairly large slots cannot be avoided, so dirt can accumulate in them and can only be removed with difficulty. These roll shutters are not therefore suitable when requirements with regard to hygiene are to be fulfilled, for example in kitchens.

With another type of sliding barrier, ribs are arranged transversely to the rolling direction on the rear of surfaces which are continuous and unslotted on the front.

The ribs have to be designed relatively thick and deep in order to achieve sufficient rigidity, thus necessitating a large fitting depth in addition to a large amount of material. Moreover, the roller shutter is difficult to move owing to the aggregation of material. It is also difficult to clean the back of it.

Furthermore, a sliding barrier is used for furniture, in which a corrugated film having lines running transversely to the rolling direction is bonded behind a smooth front film.

The structure consists, in principle, of a row of successive triangles which are rigid in themselves and which are able to rotate by bending in the rolling direction about a linear bond acting as a hinge. Large concentrations of tension build up at the bonding lines, and inevitably lead to premature fatigue fractures.

An object of the invention is to find a flat, hygienic and easy-care sliding barrier which is easy to move and is also sufficiently rigid in small radii curves and which also allows the closed space to be checked in the closed state if necessary.

According to the present invention, there is provided a sliding barrier for furniture, devices and openings in buildings, comprising a flat plastics web provided with narrow plastic reinforcing ribs which extend in a transverse direction to the sliding direction of the barrier and are joined by a resilient plastics film which is preshaped at least partially concavely and/or convexly between adjacent reinforcing ribs.

Advantages achieved by the invention lie particularly in the fact, on the one hand, that the reinforcing ribs act as double T supports in conjunction with the two films and thus reinforce the sliding barrier sufficiently against perpendicular forces, and, on the other hand, does not prevent it from unrolling uniformly as the curves of the film allow a rotating movement to be effected simply between the straight portions adjacent the reinforcing ribs. The high flexibility in the rolling direction simplifies the opening and closing movement of the sliding barrier, particularly since its weight is small.

In addition, the desired movability of the sliding barrier can be adjusted by suitable design of the material reinforcement and the shape of the curve. The reinforcement at the point where the reinforcing ribs are joined to the plastics web and film also allows lateral forces to be taken up on the sliding barrier. If less bending is desired, this can be achieved by increasing the moment of inertia by widening the portion of the film acting as the girth of the reinforcing ribs.

As large concentrations of tension do not occur with the design, no particular requirements are imposed on the material, so inexpensive plastics can also be used.

As the plastics web and film are completely separated, the sliding barrier posses the known advantages of the double wall. The sliding barrier is also easy to clean, and this is advantageous with regard to hygiene.

The double-walled sliding barrier can be extruded in one operation. The production of a multi-cell straight box profile is also conceivable, in which the impression of the curves are made subsequently on the rear by deep drawing.

The plastics used is transparent in a particular embodiment. Due to the transparency of the plastics, or example, articles in the cupboard can be identified, at least by their outline, even if the sliding barrier is closed, and this makes it easier to look for desired articles.

The plastics web and/or the film made of plastics are textured in another embodiment. If it is only desired to let the light in, the plastic web can be textured internally, for example, so that it is not possible to see right through.

In another embodiment, the lateral edge of the sliding barrier is bonded after they have been pressed together and surrounded by a U-shaped section. A deposit of moisture and possible contamination of the internal cavities is avoided by the bonding operation. The flexible U-shaped section acts as a guide for the sliding movement.

In one embodiment, the openings of the lateral edge are sealed with foam. It is possible to achieve a substantial seal from dirt particularly when using foam having closed pores.

Embodiments of the invention are illustrated in the accompanying drawings and described in more detail below. In the drawings.

Figure 1:
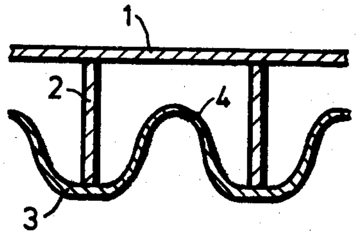
FIG. 1 shows a section through a sliding barrier with curve drawn inwards.

In FIG. 1, reinforcing ribs 2 are arranged beneath a plastic web 1 and are rigidly fixed at the other end to a plastics film 3, the reinforcing ribs and film being perpendicular to each other at the bonding points. The film 3 tapers in curve 4 so that it can be unrolled better.

Figure 2:
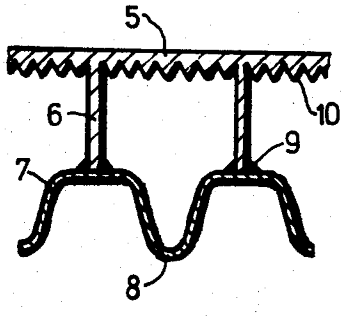
FIG. 2 shows a section through a sliding barrier with curve projecting.

In FIG. 2, a plastics web 5 is again provided with reinforcing ribs 6 and film 7 is provided with outwardly shaped curve 8, bonding points 9 being reinforced and the plastics web 5 being provided with an internal texture.

Figure 3:
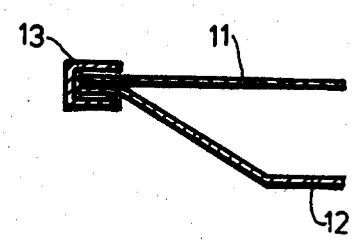
FIG. 3 shows a section through the edge of a sliding barrier.

In FIG. 3, the ends of film 12 and plastics web 11 are bonded together and surrounded by a U-shaped flexible profile 13 as a guide in which to slide.

I claim:

1. A sliding barrier for furniture, devices and openings in buildings, comprising a flat plastic web provided with narrow plastic reinforcing ribs which extend in a transverse direction to the sliding direction of the barrier, the ribs having ends joined by a resilient plastics film which is preshaped at least partially concavely and/or convexly between adjacent reinforcing ribs.

2. A sliding barrier according to claim 1, wherein the plastics material of the barrier is transparent.

3. A sliding barrier according to claim 1 or 2, wherein the plastics web is textured.

4. A sliding barrier according to claims 1 or 2 wherein the plastics film is textured.

5. A sliding barrier according to claims 1 or 2, wherein the sliding barrier has a lateral edge and the lateral edge of the sliding barrier is bonded after being pressed together and surrounded by a U-shaped profile.

6. A sliding barrier according to claims 1 or 2, wherein openings existing in the lateral edge of the sliding barrier are sealed with foam.

* * * * *